June 5, 1951  O. E. FISHBURN  2,555,963
TRANSMISSION SYNCHROMESH MECHANISM
Filed Nov. 27, 1946  2 Sheets-Sheet 1

INVENTOR.
Otto E. Fishburn,
BY Harness & Harris
ATTORNEYS.

June 5, 1951    O. E. FISHBURN    2,555,963
TRANSMISSION SYNCHROMESH MECHANISM

Filed Nov. 27, 1946    2 Sheets-Sheet 2

INVENTOR.
Otto E. Fishburn.
BY Harness & Harris
ATTORNEYS.

Patented June 5, 1951

2,555,963

UNITED STATES PATENT OFFICE 2,555,963

TRANSMISSION SYNCHROMESH MECHANISM

Otto E. Fishburn, Detroit, Mich., assignor to Chrysler Corporation, Highland Park, Mich., a corporation of Delaware Application November 27, 1946, Serial No. 712,514

8 Claims. (Cl. 192—53)

This invention relates to an improved power transmitting mechanism of the type adapted for use in a motor vehicle drive system in which positive clutch means is employed to drivingly connect torque transmitting structures.

An object of the invention is to provide simple and efficient means operable to eliminate clashing of the parts to be clutched as an incident to difference in speed of rotation thereof.

The invention has particular application to a vehicle drive system including a plurality of positive clutches and a friction clutch associated with each positive clutch to facilitate operation of the latter.

Each such friction clutch is preferably of the type employing blocker means which is energized by operation of its friction clutch to releasably block clutching of the positive clutch elements when the latter are rotating out of synchronism. Such friction clutch operates by engagement of the component parts thereof and the same may be placed under relatively light energizing pressure engagement to control operation of its blocker means as aforesaid and under relatively heavy pressure engagement to enforce synchronization of the positive clutch elements.

A further object of the invention is the provision of an improved construction and arrangement by which the components of each friction clutch are relatively positioned to energize the blocker means thereof independently of the energization of the blocker means of the other friction clutch, and more particularly to provide an arrangement wherein a component of one such clutch cooperates with a component of another clutch to position the components of each friction clutch in relatively light pressure energizing engagement.

Where such friction clutches employ engaging frustro-conical friction surfaces and there is a tendency of such surfaces to relatively separate, a further object of the invention is the provision of an arrangement wherein a component of each friction clutch cooperates with a component of the other clutch to oppose and limit such separatory movement at each clutch.

As a further feature of the invention the friction clutches are individually energized and are interdependent only to the extent that one thereof cooperates with the other to position the parts of each for individual energization and neither clutch is deenergized by the synchronizing operation of the other. Thus each friction clutch is always conditioned to block a relatively fast asynchronous clutching shift and insure positive clutching without clashing of teeth.

Other objects and advantages of the invention will be more apparent from the following description taken in connection with the accompanying drawings in which.

Figure 1:
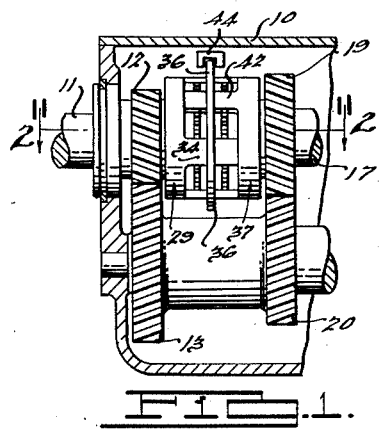
Fig. 1 is a fragmentary elevational view of a portion of a power transmitting mechanism embodying the invention.
Figure 2:
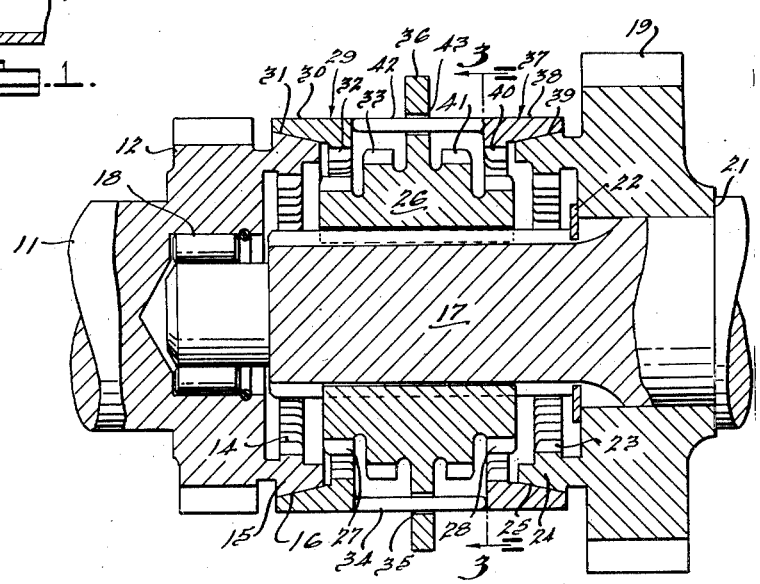
Fig. 2 is an enlarged fragmentary sectional view taken as indicated by the line 2—2 of Fig. 1.
Figure 3:
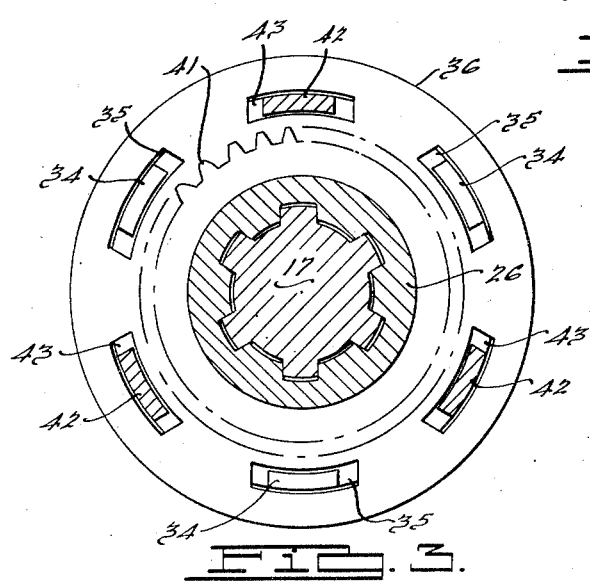
Fig. 3 is a transverse sectional view taken on line 3—3 of Fig. 2.

Referring to the drawings and particularly Figs. 1 to 3, the invention is illustrated and described in connection with power transmitting of a motor vehicle which includes a housing 10 into which a driving shaft 11 extends, such shaft being releasably connected to an engine shaft through a clutch, not shown. Integral with the shaft 11 is a driving pinion 12 in constant mesh with a countershaft gear 13, a set of positive clutch teeth 14, and a part 15 of a friction clutch having a frustro-conical friction surface 16. A transmission driven and output shaft 17 is coaxial with the shaft 11 and journalled therein as at 18, the shaft 17 being connected to the vehicle drive wheels in the well known manner. Rotatably mounted on shaft 17 is a gear 19 in constant mesh with a countershaft gear 20, the gear 19 being axially fixed between a shoulder 21 on shaft 17 and a retainer 22. The gear 19 is provided with a set of positive clutch teeth 23 and a friction clutch part 24 having a frustro-conical friction surfaces 25.

A sleeve-like clutch member 26 is shiftably splined on the shaft 17 between the drive pinion 12 and gear 19 and provided with a first set of positive clutch teeth 27 adapted to clutch with teeth 14 when the member 26 is shifted to the left as viewed in Fig. 2 to provide a direct drive between shafts 12 and 17, and a second set of clutch teeth 28 adapted to clutch with teeth 23 when member 26 is moved to the right as viewed in Fig. 2 to provide a second speed forward drive between such shafts. Other well known speed drives including reverse, may be included in the mechanism. Inasmuch as the clutch member may rotate at a speed differing from the speed of either pinion 12 or gear 19, a friction clutch is employed to prevent clutching of the positive clutch teeth thereof prior to approximate synchronization, each clutch preferably being of the blocking, synchronizing type.

Figure 4:
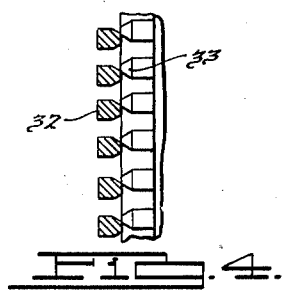
Fig. 4 is a top plan view typifying cooperating blocking teeth in blocking position.

The friction clutch between the member 26 and pinion teeth 14 includes a friction part 29 cooperating with the part 15 and having an annular body 30 provided with an internal frustro-conical friction surface 31 and a set of internal blocker teeth 32 adapted to cooperate with blocker teeth 33 of the clutch member 26 to block and accommodate shift of said member as hereafter set forth. Projecting axially from the annular body 30 are a plurality of circumferentially spaced fingers 34, each of which passes through an opening 35 in a flange 36 of member 26, each such opening being so enlarged circumferentially with respect to its finger as to accommodate limited rotative movement between the part 29 and member 26. When the fingers 34 are at either extreme of such movement, as when engaged with either of the circumferentially opposite end walls of the respective openings, the teeth 32 are respectively axially so aligned with the teeth 33, as typified in Fig. 4, as to engage therewith and block clutching shift of the member 26. The ends of the teeth so aligned are preferably provided with cam surfaces, as shown in Fig. 4. The fingers 34 thus cooperate with flange 36 to provide a lost motion rotary driving connection between the part 29 and clutch member 26.

The friction clutch between the clutch member 26 and gear 19 includes a friction part 37 cooperating with the part 24 and having an annular body 38 provided with an internal frustro-conical friction surface 39 and a set of internal blocker teeth 40 adapted to cooperate with blocker teeth 41 of the clutch member 26 to block and accommodate clutch shift of such member as hereinafter set forth. Projecting axially from the body 38 are a plurality of circumferentially spaced fingers 42, respectively passing through openings 43 in the flange 36 of the member 26, each such opening being so enlarged circumferentially with respect to its finger as to accommodate limited rotative movement between the part 37 and member 26. When the fingers are at either extreme of such movement, as when engaged with either of the circumferentially opposite end walls of the respective openings, the teeth 40 are respectively so axially aligned with the teeth 41, as typified in Fig. 4, as to engage therewith and block clutching shift of the member 26. The ends of the teeth so aligned are preferably provided with coacting cam surfaces, as shown in Fig. 2. The fingers 42 thus cooperate with the flange 36 to provide a lost motion rotary driving connection between the part 37 and member 26.

The fingers 34 and 42 are arranged alternately circumferentially and the fingers 34 abut the annular body 38 of the friction part 37 while the fingers 42 abut the annular body 30 of the friction part 29 and thus position the friction parts 29, 30 in engagement with the respective cooperating parts 15, 24. As thus positioned the cooperating parts 15, 29 of the forward friction clutch are under relatively light energizing pressure sufficient to cause the part 29 to rotate with its part 15 and relative to clutch member 26 to the extreme provided by the clearance between fingers 34 and the slots 35 and thus position the blocking teeth 32 aligned with the cooperating teeth 33 as aforesaid. This rotative energization of the clutch will occur when the positive clutch parts are rotating out of synchronism, it being understood that the support of the part 29 on the part 15 plus the presence of an oil film between the engaged friction surfaces of these parts tends to cause the part 29 to rotate with the part 15 and thus contribute to energization of the friction clutch. The friction clutch between the member 26 and gear 19 is conditioned for operation in like manner to the forward clutch and each clutch is thus energized in advance of initiating the selected clutching shift of member 26. Each of the friction surfaces 31 and 38 of the parts 29 and 37 is preferably bronze and is threaded to cut through the oil film at the engaging surfaces and thereby increase the gripping action and minimizing wear. Threading provides for oil retreat during friction clutching when the oil film is cut and the oil is displaced.

The illustrated arrangement provides for energization of one of the friction clutches independently of the other. When employed in the drive system of a motor vehicle the mechanism operates under conditions wherein the rotative speed of the member 26 may be either faster or slower than that of the pinion 12 while the same may be true simultaneously with respect to member 26 and gear 19 and under such circumstance either friction part 29, 37 is freely responsive for energization to the condition existing between these positive clutch parts with which it is associated.

The clutch member 26 is shown in its neutral position between clutch teeth 14 of drive pinion 12 and clutch teeth 23 of the second speed gear 19, and each set of fingers 34, 42 is so positioned relative to the flange 36 as to dispose each set of blocker teeth 32, 40 in non-blocking relation with respect to the cooperating blocking teeth 33, 41. As a typical clutching operation, let it be assumed that the power transmitting mechanism has been first operated in a third or low speed drive from shaft 11 to shaft 17 on initial forward operation of the vehicle and the operator desires to establish the second speed drive by clutching member 26 with teeth 23 of the second speed gear 19. During such low speed drive the second speed gear 19 and its clutch teeth 23 will be rotated through the countershaft drive connection with pinion 12 of shaft 11, and the clutch member 26 will rotate with shaft 17. When a speed differential exists between member 26 and gear 19, the part 37 being in energizing engagement with its cooperating part 24 will be rotated relative to the clutch member 26 to one extreme of its movement, as provided by the lost motion connection with member 26, to position the blocker teeth 40 in blocking relation with respect to the cooperating blocker teeth 41, as typified in Fig. 4, prior to initiating the second speed clutching shift of the member 26. Therefore, as the member 26 is shifted axially to clutch with teeth 23, a cammed end of a tooth 41 will engage a cammed end of its aligned tooth 40 to thrust the part 37 into relatively heavy synchronizing engagement with its cooperating part 24. When the desired synchronous condition is established between gear 19 and member 26 continued shift of the latter will cam the teeth 40 out of blocking position with respect to teeth 41 and permit positive clutching of teeth 28 with teeth 23. During such thrusting to establish the synchronizing pressure the axial increment of movement of the part 37 from energized position is relatively minute and does not deenergize the other friction clutch. To establish the aforesaid synchronizing engagement the part 37 is moved axially relative to the part 29 of the other clutch and the latter part is restrained under such condition by part 37 only to the extent that axial separation of part 29 from its cooperating part is limited to the minute increment of movement of part 37. Upon release of the force applying pressure the part 37 will return to its energized position, such movement being limited by the other movable part 29. In shifting down from direct drive to second speed drive the friction clutch operates in like manner to the above upshift. Also the friction clutch controlling clutching teeth 27 of member 26 with teeth 14 of pinion 12 to establish the direct speed drive will operate as set forth in connection with the friction clutch controlling establishment of the second speed drive. It will be understood that the clutch, not shown between shaft 17 and the engine, is operative to release the drive to the shaft 17 when either the direct or second speed ratio drive is to be established as aforesaid and when so released the clutch member 26 is shifted by any well known shift apparatus including a collar 44 connected with the flange 36.

Figure 5:
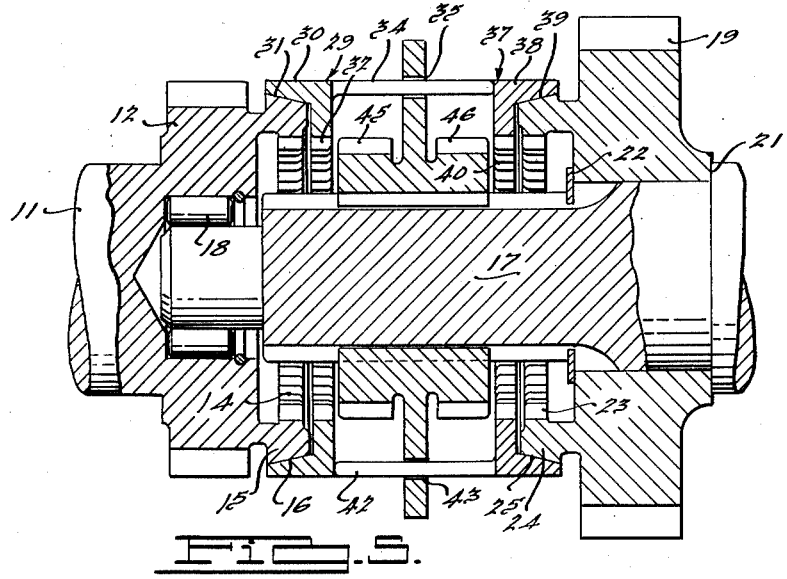
Fig. 5 is a view similar to Fig. 2 showing another embodiment of the invention.

The form of the invention shown in Fig. 5 is substantially similar in construction and operation of the aforesaid embodiment but differing therefrom in that the sets of teeth 45 and 46 serve as both blocking and positive teeth.

Figure 6:
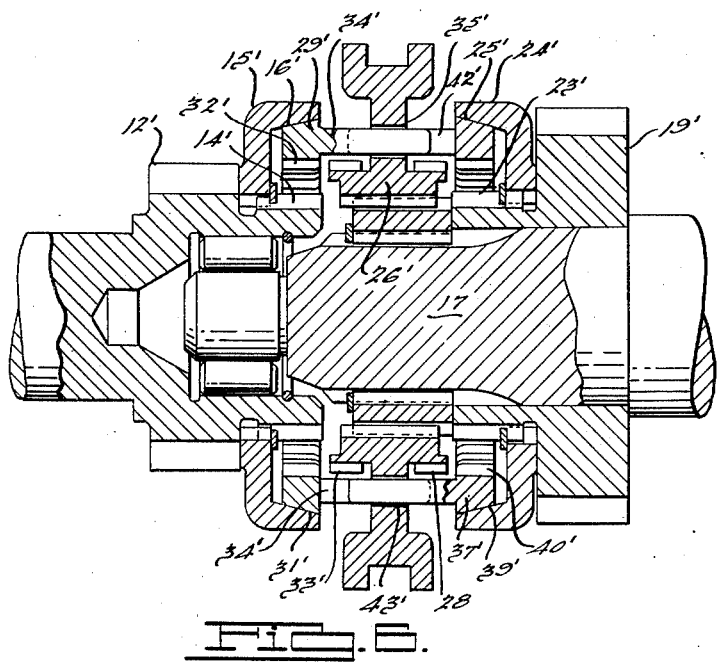
Fig. 6 is a view similar to Fig. 2 showing a further embodiment of the invention.

In the Fig. 6 embodiment the pinion 12' has a set of external clutch teeth 14' and a friction clutch part 15' in toothed driving engagement with teeth 14' for rotation therewith, the part 15' being provided with an internal friction surface 16'. The gear 19' has a set of external clutch teeth 23' and a friction clutch part 24' in toothed driving engagement with teeth 23' provided with a friction surface 25'. The clutch member 26' is splined on shaft 17 for axial shift to selectively clutch the splines thereof with the sets of teeth 14' and 23'.

A friction clutch is provided for controlling each clutching shift of the member 26', such clutch between teeth 14' of pinion 12' and the member 26' including a friction clutch part 29' similar to part 29 but differing therefrom in that the former has an internal friction surface 31'. The blocking teeth 32' cooperate with blocking teeth 33' of member 26'' and the fingers 34' extend through openings 35' with circumferential clearance therewith in the manner shown and described in connection with the Fig. 1 embodiment.

The friction clutch between member 26 and teeth 23' of gear 19' includes a friction part 37' having an external friction surface 39', and blocker teeth 40' adapted to cooperate with blocker teeth 28' of member 26'. The tails 42' through openings 43' with circumferences for operation as in the Fig. 1 embodiment. The tails 34' and 42' are engaged respectively with parts 29 and 37 to position the latter in energizing pressure engagement with the cooperating friction parts as in the first embodiment and the operation of the instant embodiment corresponds to the operation set forth for the first embodiment.

I claim:
1. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, relatively rotatable friction clutch devices each including an annular friction clutching body axially spaced from the friction clutching body of the other device, positioned for continuous relatively light frictional driving engagement with a respective clutch part prior to selected shift of said clutch member from its neutral position and adapted for thrust movement in an axial direction one away from the other to effect relatively heavy frictional synchronizing engagement of such body with its friction clutch part, a projection having a fixed axial length carried by and rotatable with each friction clutching body extending generally axially therefrom and having a lost motion connection with respect to said third structure accommodating limited rotary movement of such projection and its friction clutching body relative to said third structure and said clutch member in response to said frictional driving engagement of such body with its said clutch part, said clutch member and each device having means cooperating to form a releasable thrust transmitting connection therebetween when the projection and friction clutching body of such device are at a limit of the aforesaid rotary movement to thereby thrust the friction clutch body of such device in its said axial direction of movement in response to a selected shift of said clutch member, the projection of each device rotatively abutting the other device when said clutch member is in its neutral position and constituting the sole means for positioning said bodies in said continuous relatively light frictional driving engagement with the respective clutch parts.

2. In a device of the character described in combination, a shaft, a pair of relatively rotatable torque transmitting members mounted coaxially with said shaft, a set of positive clutch teeth and a friction clutch element disposed for rotation with each of said members, a clutch sleeve mounted to rotate with said shaft and shiftable from a neutral position thereof selectively in opposite directions axially of said shaft, said clutch sleeve having positive clutching means selectively engageable with said sets of clutch teeth to selectively clutch said members with said shaft, a pair of synchronizer rings spaced from each other axially of said shaft, each of said rings having a friction portion engageable with one of said elements to provide a friction clutch, means for rotatably driving each of said rings with said sleeve and shaft, said driving means accommodating oscillation within predetermined limits between each of said rings and said sleeve, blocker thrust transmitting means carried by said sleeve and said rings for releasably blocking selective clutching shift of said sleeve during asynchronous rotation of said shaft and the member selected for clutching therewith, said blocker thrust transmitting means providing selective thrust transmitting connections between said sleeve and rings when said rings are disposed at a limit of their aforesaid oscillation for selectively effecting relatively heavy frictional engagement of said friction clutches, and ring positioning means maintaining said rings in such predetermined relatively spaced apart relationship in association with said friction clutch elements as to constantly effect relatively light frictional driving engagement of said friction clutches when said sleeve is in its said neutral position thereby inducing movement of said rings to a limit of their aforesaid oscillation, said ring positioning means comprising a rigid unitary spacer extending between said rings and oscillatible with one thereof and rotatively and axially abutting the other.

3. In a synchronizer, relatively rotatable driving members, a rotatable driven member coaxial with said driving members, clutch teeth rotating with each of said driving members, a friction clutch between each of said driving members and said driven member, each of said clutches comprising a driving friction component rotating with one of said driving members and a driven friction component rotating with said driven member, means for mounting said driven friction components for thrusting movement thereof one away from the other in the direction of said axis, a shiftable thrust transmitting clutch member rotating with said driven member and having clutch teeth for selectively positively clutching said driven member with said driving members, means providing a releasable thrust transmitting synchronizing connection between said shiftable clutch member and each of said driven friction components for selectively effecting a synchronizing relation between the components of said friction clutches, means for mounting said shiftable clutch member for shifting movement selectively in opposite directions to selectively thrust one of said driven friction components into synchronizing relation as aforesaid with its driving friction component and then positively clutch said driven member with one of said driving members as aforesaid, and a rigid reach member supported at one end thereof by the driven friction component of one of said friction clutches for rotation therewith and against circumferential and axial movements relative thereto and extending toward and into axial and rotative abutting engagement with a portion of the driven friction component of the other friction clutch for limiting movement of said driven friction components axially toward each other while accommodating their relative separation, said reach member being of such length in relationship with the disposition of said driving friction components as to maintain the driven friction component of each of said friction clutches in continuous light frictional driving engagement with its driving friction component when said shiftable clutch member is in its neutral position.

4. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, relatively rotatable friction clutch devices respectively engageable with said friction clutch parts, each device including blocker means adapted to be disposed in position to releasably block a selected clutching shift of said clutch member in response to limited rotary movement of such device relative to said clutch member, and means positioning each device in frictional driving engagement with its associated clutch part for rotation of such device as aforesaid to thereby dispose the blocker means thereof in said blocking position prior to selected shift of said clutch member from its neutral position, said means comprising axially extending projections, one supported by each device and fixed at one end thereof to its said device against axial movement relative thereto, the projection of each device extending into an opening in said clutch member with circumferential clearance therein to accommodate said limited rotation of its device relative to said clutch member and rotatively axially abutting the other device when said clutch member is in its neutral position.

5. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, relatively rotatable friction clutch devices respectively engageable with said friction clutch parts, each device including blocker means adapted to be disposed in position to releasably block a selected clutching shift of said clutch member in response to limited rotary movement of such device relative to said clutch member, and means positioning each device in frictional driving engagement with its associated clutch part for rotation of such device as aforesaid to thereby dispose the blocker means thereof in said blocking position prior to selected shift of said clutch member from its neutral position, said means comprising a rigid element supported at one end thereof by one of said devices for rotation therewith and against circumferential and axial movement relative thereto and having circumferential clearance with said clutch member accommodating said limited rotary movement of said one device, the other end of said element rotatively abutting the other of said devices when said clutch member is in its said neutral position.

6. In a power transmitting mechanism, first and second rotatable torque transmitting structures each having a set of clutch teeth and a friction clutch element disposed for rotation therewith, a third rotatable torque transmitting structure coaxial with and adapted to be selectively drivingly connected with said first and second structures, a clutch member rotatably driven with said third structure and adapted to be shifted from a neutral position thereof for selective clutching engagement with said sets of clutch teeth thereby to provide said selective drive connections, said member having a plurality of circumferentially spaced openings therein, relatively rotatable friction clutch devices respectively associated with said friction clutch elements and having a body part provided with a friction surface engageable with the associated friction clutch element and spaced axially from the body part of the other device, each device including a part circumferentially and axially rigid with the body part thereof and projecting axially therefrom through an opening in said clutch member with circumferential clearance therein, each device including blocker means carried by one of the said parts thereof and adapted to be disposed in position to releasably block a selected clutching shift of said clutch member in response to frictional driving engagement of the clutching surface of such device with the associated friction clutch element, the projecting part of each device bridging the space between said body parts and rotatively axially abutting the body part of the other device to position the friction clutching surface of each device in continuous frictional driving engagement with its associated friction clutch element to thereby dispose the blocking means of each device in the said blocking position prior to selected shift of said clutch member from its neutral position.

7. A power transmitting mechanism comprising in combination first and second relative rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, friction clutches repectively controlling selected clutching of said clutch member with said sets of clutch teeth, each clutch including cooperating parts, one thereof having means movable by frictional driving engagement with its cooperating part to block the selected clutching shift of said clutch member when the latter and teeth selected for clutching therewith are rotating asynchronously, said clutch member during said selective shift thereof acting on such blocker means to thrust said one friction clutch part into synchronizing engagement with its cooperating part, the friction clutch parts having the said blocker means being so disposed in rotative and axially abutting engagement one with the other when said clutch member is in its neutral position as to position each such part in said frictional driving engagement with its cooperating clutch part prior to selected shift of said member from its neutral position.

8. In a power transmitting mechanism, first and second rotatable torque transmitting structures each having a set of clutch teeth and a friction clutch element disposed for rotation therewith, a third rotatable torque transmitting structure coaxial with and adapted to be selectively drivingly connected with said first and second structures, a clutch member rotatably driven with said third structure and adapted to be shifted from a neutral position thereof for selective clutching engagement with said sets of clutch teeth thereby to provide said selective drive connections, said member having a plurality of circumferentially spaced openings therein, relatively rotatable friction clutch devices respectively associated with said friction clutch elements and having a body part provided with a friction surface engageable with the associated friction clutch element and spaced axially from the body part of the other device, each device including a part circumferentially and axially rigid with the body part thereof and projecting axially therefrom through an opening in said clutch member with circumferential clearance therein, each device including blocker means carried by the body part thereof and adapted to be disposed in position to releasably block a selected clutching shift of said clutching member in response to frictional driving engagement of the clutching surface of such device with the associated friction clutch element, the projecting part of each device bridging the space between said body parts and rotatively axially abutting the body part of the other device to position the friction clutching surface of each device in continuous frictional driving engagement with its associated friction clutch element to thereby dispose the blocking means of each device in the said blocking position prior to selected shift of said clutch member from its neutral position.

OTTO E. FISHBURN.

REFERENCES CITED

The following references are of record in the file of this patent:

UNITED STATES PATENTS

| Number | Name | Date |
| --- | --- | --- |
| Re. 22,265 | White | Feb. 9, 1943 |
| 1,786,980 | Carling | Dec. 30, 1930 |
| 1,931,288 | Griswold | Oct. 17, 1933 |
| 2,221,899 | White et al. | Nov. 19, 1940 |
| 2,221,900 | White et al. | Nov. 19, 1940 |
| 2,369,842 | Neracher | Feb. 20, 1945 |
| 2,376,512 | Schotz | May 22, 1945 |
| 2,397,344 | Fishburn | Mar. 26, 1946 |
| 2,483,841 | Peterson et al. | Oct. 4, 1949 |